United States Patent Office 3,076,696
Patented Feb. 5, 1963

3,076,696
METHOD AND COMPOSITION FOR TESTING FOR SODIUM
Edward Wilkins Reeve, College Park, Md., assignor to Fundamental Research, Inc., Wilmington, Del., a corporation of Delaware
No Drawing. Filed July 16, 1956, Ser. No. 599,671
15 Claims. (Cl. 23—230)

This invention relates to the preparation of new compositions of matter and their use in chemical and other fields.

In the analytical field of chemistry there are available tests for the sodium ion, but there is need for tests, both qualitative and quantitative, that are more sensitive and more accurate. There is also a definite need for methods that are simpler and that are less subject to interference by other ions than the methods now available.

An object of this invention is to provide new methods for qualitatively and quantitatively testing for sodium ion. Another object is the provision of new compositions of matter useful in testing for sodium ion. A still further object is the provision of new compositions of matter in simple, stable form for use as analytical reagents. Other objects will appear hereinafter.

The objects of this invention are accomplished by the provisions of alpha-methoxyphenylacetic acid compounds and compositions containing them. Such compounds may be the free acids themselves, fully or partially neutralized salts thereof, and acid salts thereof among other derivatives. The compounds are exemplified by alpha-methoxyphenylacetic acid and salts prepared from nitrogen containing salt-forming materials such as ammonia, amines or quaternary ammonium hydroxides or metal salts prepared from such compounds as potassium hydroxide.

In the testing for sodium ions, the materials of this invention that are used are substantially sodium-free and comprise mixtures of the free acid and a salt of the acid. The mixture is generally in the form of an aqueous solution which contains an organic solvent. This solution is added to the material being tested for sodium ion under conditions designed to give an optimum amount of precipitated sodium acid salt of the alpha-methoxyphenylacetic acid being used. The confirmed precipitation of the acid salt qualitatively indicates the presence of sodium. Because of the great insolubility of the acid salt under the test conditions, a quantitative measure, either gravimetric or volumetric, of sodium is readily and accurately made.

This invention will be further understood by reference to the following examples which are given for illustrative purposes only and are not limitative.

EXAMPLE I

This example pertains to the qualitative testing for sodium ions.

A good reagent for the qualitative detection or quantitative determination of sodium ion is an aqueous alcoholic solution of alpha-methoxyphenylacetic acid approximately half neutralized with a base such as tetramethylammonium hydroxide or potassium hydroxide. In order to obtain a reagent having the properties of maximum sensitivity to sodium ion together with maximum freedom from interference by other ions, a preliminary investigation was made of the effect on these properties of the ratio of acid in the reagent, the ratio of alcohol to water, the total concentration of combined and free alpha-methoxyphenylacetic acid, and the volumes of reagent to be used per volume of solution to be tested. The reagent described below is sensitive to sodium ion, but will not form precipitates with ammonium and lithium ions from solutions of their chlorides less than 20% saturated nor with magnesium and potassium ions from solutions of their chlorides less than 50% saturated.

The composition of the reagent is as follows: 133.3 g. (0.8 mole) alpha-methoxyphenylacetic acid 0.3 mole (278 ml. of 1.08 N) tetramethylammonium hydroxide aqueous solution or equivalent amount of 1 N potassium hydroxide solution, and absolute alcohol to a final volume of 1 liter.

The solution is allowed to stand at room temperature for at least five hours with occasional shaking, and then at 0° C. for twelve hours. The cold solution is decanted from the precipitate and filtered with suction. A flocculent precipitate may form in the clear solution after standing a day or two or room temperature; this is removed by filtration and is discarded.

The ethyl alcohol is present in the reagent to prevent the precipitation of the free acid and to decrease the solubility of the sodium acid salt. The base is present to partially neutralize the acid, and to make a buffered system so that the sodium acid salt will have its minimum solubility. The use of tetramethylammonium hydroxide is advantageous in that the test can be carried out at a lower temperature, thereby increasing the sensitivity of the reagent, and also in that no inorganic material (except traces of sodium) are introduced into the solution being tested. Accordingly, in the testing procedure after filtering off the precipitated sodium acid salt, the filtrate can be evaporated, ashed if necessary, and examined for other elements. Potassium hydroxide is cheaper and almost as satisfactory; therefore if the introduction of potassium salts into the solution being tested is not harmful, it may be used.

Two procedures for qualitative tests have been developed for using the reagent employing tetramethylammonium hydroxide as the base. The "15° procedure" involves maintaining the test solution at 15° C. for as long as the mixture is observed. This is tedious if the room temperature is considerably above this temperature. The "0° procedure" involves placing the test tube containing the test solution in an ice bath for the desired time, and then transferring the test tube to a beaker of water at 20° C. and stirring constantly for the five minutes necessary for any precipitated salts (such as potassium chloride, lithium chloride, etc.) to dissolve. The two procedures are about equally sensitive. In each, the solution to be tested, if not already so, is brought to approximate neutrality so that the reagent can buffer the final mixture to a pH of about 3.1. This affords optimum precipitation of the sodium acid salt. If the solution to be tested is basic, dilute hydrochloric acid with methyl red or methyl orange as an indicator may be used; if acidic, a sodium-free base is employed in the neutralization.

The procedure for the reagent using potassium hydroxide is analogous to the "15° procedure" but is best carried out at 20° to obtain maximum sensitivity and freedom from interfering precipitates. This reagent is slightly less sensitive.

"15° procedure": One milliliter of the approximately neutral (pH 3 to 7) solution to be tested is mixed in a 12 by 75 mm. test tube with three milliliters of the reagent prepared with tetramethylammonium hydroxide. The test tube is placed in a small beaker of water at 15° C. and the contents stirred occasionally with a glass rod. A voluminous, finely crystalline white precipitate of the sodium acid salt will form within fifteen minutes when as little as 0.6 mg. of sodium ion is present if high concentrations of other salts are not present in the sample. Smaller amounts of sodium may not precipitate until after several hours; larger amounts will precipitate within a minute or two. If large amounts of other salts are present, a longer time is required for the precipitation of the sodium-acid salt.

"0° procedure": The procedure is as above, except that the test tube is placed in an ice bath. If no precipitate forms within ten or fifteen minutes, it can be left in the ice bath for several hours. The formation of a precipitate during this time may be due to either the sodium acid salt or other salts precipitating out of solution at this temperature. Quite often the latter form supersaturated solutions and do not precipitate immediately. After an hour or two, the test tube is transferred from the ice bath to a small beaker of water at 20°. Any crust of precipitated salts is removed from the lip of the test tube and from the stirring rod and is discarded. It is such large solid clumps of crusted salts that dissolve slowly. The contents of the test tube are stirred for five minutes. The fine crystals of the sodium acid salt have a characteristic appearance and are easily recognized. After stirring for five minutes, the interfering salts will have dissolved if not present in amounts greater than indicated in Table I below.

A positive test can be confirmed by the insolubility of the precipitate in acetone or isopropyl alcohol (which dissolve alcohol-soluble materials and remove the excess reagent), by its insolubility in a saturated solution of the sodium acid salt (which dissolves all other water-soluble magnesium, ammonium, lithium, potassium and rubidium salts), and by its complete solution in ammonium carbonate-ammonium hydroxide solution (to demonstrate the absence of other cations which, if present, might have formed an insoluble salt with the alpha-methoxyphenylacetic acid reagent).

In confirmation the contents of the test tube, after stirring at 20° C. for 5 min., are transferred to a 15 ml. graduated centrifuge tube, the mixture is centrifuged for a few seconds, the liquid poured off, the sides of the tube washed and the precipitate stirred with 2 to 5 ml. of isopropyl alcohol or acetone, again centrifuged for a few seconds, and the liquid poured off. One milligram of sodium ion (16 mg. of the precipitate) will have a volume of around 0.1 ml. The precipitate will not dissolve when stirred with four volumes of an aqueous solution of the sodium acid salt saturated at room temperature, but on adding five drops of 6 N ammonium carbonate-ammonium hydroxide solution to this suspension, it promptly dissolves giving a clear solution. If more than 10 mg. of cesium ion per ml. of original sample is present, much of the precipitate will dissolve on stirring with the saturated aqueous solution of the sodium acid salt, but some insoluble precipitate will remain, even if no sodium is present.

Calcium, strontium, and barium ions when present in more than traces may interfere. Precipitation with excess ammonium carbonate-ammonium hydroxide reagent effectively eliminates these, even when the filtrate is concentrated twenty fold before testing for sodium. In carrying out this procedure, the ammonium salts should be largely removed by ignition.

When tested by the "15° procedure," ammonium chloride will not interfere when present in moderate amounts. Precipitation will occur if the solution to be tested is more than 25% saturated. Lithium chloride will not interfere providing the solution to be tested is not over 20% saturated. Potassium chloride and magnesium chloride solutions will not cause interfering precipitates, even when their solutions are 50% saturated. While the presence of large amounts of these salts does lower the sensitivity of the test, solutions containing both potassium chloride and lithium chloride, or these two and also magnesium chloride, do not give interfering precipitates when less than 20% saturated. Similar results are obtained with the "0° procedure" after stirring the reaction mixture in the test tube at 20° C. for five minutes.

With many of the above interfering ions, there is a decided tendency for supersaturation to occur, so that solutions even more concentrated than those indicated above may not give an interfering precipitate at 15° C. The interfering ion may not precipitate until after standing hours or days, or until the solution is cooled to 0° C.

Rubidium and cesium also form acid salts with alpha-methoxyphenylacetic acid. They can be prepared in the same manner as the sodium acid salt if concentrated solutions of their halides are used. The rubidium salt is relatively soluble and normally will not precipitate at 20° C. from a 0.3 M solution. If some does precipitate, it dissolves almost instantly during the confirmatory test when the precipitate is treated with the four volumes of the saturated solution of the sodium acid salt. The cesium acid salt is sufficiently insoluble so that it will interfere with the test for sodium ion if more than 10 mg. per ml. of test solution is present. When a saturated solution of the sodium acid salt is mixed with a saturated solution of the cesium acid salt, a small but definite amount of a precipitate slowly forms. Both acid salts were identified by titration with standard base; their neutralization equivalents corresponded closely with the theoretical values.

It is unusual to find cesium behaving like sodium rather than like potassium. The rubidium and cesium salts are of value as an intermediate for the purification of rubidium and cesium compounds.

While the reagent of this invention is not quite as sensitive as the zinc uranyl acetate reagent, it is a much better agent for with it one can detect sodium in the presence of high concentrations of other salts. Thus, one part of sodium ion can be detected in the presence of 150 parts of potassium ion or in the presence of 70 parts of lithium ion.

In the following table, a positive test is one in which sufficient precipitate forms to settle out of solution within a few hours at the indicated temperature. Smaller amounts can be detected with experience. The source of the sodium ion was sodium chloride in all cases. The 15° and 0° procedures were carried out using reagent prepared with tetramethylammonium hydroxide; the 20° procedure involved potassium hydroxide.

Table I
SENSITIVITY [1] TO Na+ IN PRESENCE OF OTHER SALTS

| Composition of Test Solution Containing Sodium Ion | Mg. of Sodium Ion per ml. of Test Solution,[2] (time in min.) | | | | |
| --- | --- | --- | --- | --- | --- |
| | 0.2 | 0.3 | 0.4 | 0.6 | 1.0 |
| By "15° Procedure" [3] | | | | | |
| Distilled water [4] | | brd (6 hrs.) | pst (60) | pst (12) | pst (3). |
| 20% Saturated LiCl (4 M) | | | pst (3 hrs.) | pst (45) | pst (15). |
| 50% Saturated MgCl₂ (8 M) | | | | brd (4 hrs.) | pst (60). |
| 50% Saturated KCl (2.3 M) | | | pst (4 hrs.) | pst (120) | pst (10). |
| By "0° Procedure" | | | | | |
| Distilled water | pst (12 hrs.) | pst (90) | pst (60) | pst (12) | pst (3). |
| 20% Saturated LiCl (4 M) | | | pst (75) | pst (30) | pst (10). |
| 50% Saturated MgCl₂ (8 M) | | | | pst (24 hrs.) | pst (150). |
| 50% Saturated KCl (2.3 M) | | | brd (24 hrs.) | pst (8 hrs.) | pst (30). |
| By "20° Procedure" | | | | | |
| Distilled water | | | | pst (60) | pst (10). |

[1] The sensitivity is expressed as the mg. of sodium ion per ml. of test solution which gives a definite precipitate of the sodium acid salt when the test solution is mixed with three volumes of the reagent and allowed to stand as indicated.
[2] Abbreviations: pst, positive; brd, borderline.
[3] For this procedure, the reagent is most sensitive when saturated with the sodium acid salt at 25° C., not at 0° C. as given in the directions. The results given were obtained with the reagent prepared by this modified procedure.
[4] When the test was carried out at 25° C., 0.6 mg. was borderline in 2 hours; 1.0 mg. was positive in 5 minutes.

The disadvantage of carrying out the test at ice bath temperature is that precipitates are obtained with concentrated solutions of many alkali metal salts. However, they dissolve on stirring for five minutes at higher temperatures, whereas the sodium acid salt does not.

Pertinent data are given in Table II.

Table II
REDISSOLVING [1] TEMPERATURES OF PRECIPITATES FORMED BY COOLING TO 0° C.

| Salt Solution | Redissolves, °C. |
| --- | --- |
| 25% Saturated NH₄Cl (2 M) | 17. |
| 50% Saturated NH₄Cl (2 M) | 19. |
| 20% Saturated LiCl (4 M) | 13. |
| 50% Saturated LiCl (9 M) | 25. |
| 50% Saturated MgCl₂ (8 M) | no precipitate at 0° C. |
| 50% Saturated KCl (2.3 M) | 11.[2] |
| water alone | no precipitate at 0° C. |
| 0.08 M CsCl | 20. |
| 0.3 M RbCl | 20. |

[1] Reaction mixture consists of 1 ml. of the salt solution mixed with 3 ml. of the reagent prepared with tetramethylammonium hydroxide.
[2] With the reagent prepared with potassium hydroxide, the temperature is 16° C.

With reference to the procedures described in this example, similar results are attained when 3,4-dichloro-alpha-methoxyphenylacetic acid is used instead of alpha-methoxyphenylacetic acid.

EXAMPLE II

This example deals with the preparation of a reagent of this invention for use in quantitatively testing for sodium ions. The reagent is also suitable for the qualitative detection of sodium ion. It is preferred that the final composition of a liter of the reagent should be as follows: 0.5 M in free alpha-methoxyphenylacetic acid and 0.32 to 0.34 M in tetramethylammonium alpha-methoxyphenylacetate sufficient solvent to make 1 liter, the composition of the solvent being 625 ml. of a denatured ethanol (for instance, 563 ml. abs. ethanol plus 31 ml. methanol plus 31 ml. water) and 225 ml. water.

Sixty grams of C.P. pellet sodium hydroxide is stirred with 150 ml. denatured alcohol for 45 to 60 minutes. A thick solution, containing much suspended matter, results. This is poured off from the undissolved pellets and a 3 ml. sample titrated to determine its exact normality, which will be about 4.5 N. A volume equal to exactly .51 mole (about 113 ml.) is used subsequently.

Fifty five grams (0.5 mole) of tetramethylammonium chloride is dissolved in 140 ml. of denatured alcohol in a 3 necked flask. Heating on a steam bath is required and a reflux condenser is used to prevent loss of solvent. The flask is removed from the steam bath, fitted with a mechanical stirrer, allowed to cool to around 40° C. (crystallization of the tetramethylammonium chloride should not occur) and the solution of the 0.51 mole of sodium hydroxide added in a small stream. The mixture is stirred for 30 min., cooled to about 25° C. and filtered with suction. A 3 ml. sample is titrated to determine the normality of the solution; it should be 1.5 to 1.6 N in hydroxyl ion of which 0.2 N is due to sodium hydroxide and the rest of which is due to tetramethylammonium hydroxide.

Sufficient tetramethylammonium hydroxide solution to make 0.35 mole of tetramethylammonium hydroxide (about 260 ml.) is measured out. Of this, 30 ml. represents solids, and the remainder solvent. Sufficient additional denatured alcohol solvent to make a total of 520 ml. of solvent (about 290 ml.) is measured out and 150 g. (0.905 mole) of alpha-methoxyphenylacetic acid is dissolved in it, and 190 ml. of water is added. The quaternary ammonium hydroxide and the acid solutions are combined. The mixture is stirred for three hours at room temperature, and filtered as quantitatively as possible through a previously weighed 9 cm. filter and filter paper with suction. The precipitate is washed on the filter with 10 to 20 ml. of a mixture consisting of 75 ml. of the denatured alcohol and 25 ml. of water, and the washing added to the main filtrate. After sucking the precipitate as dry as possible, the filter and precipitate are placed in a warm place, such as over a radiator, and weighed the following day.

A 10 ml. sample of the reagent is titrated to determine the free alpha-methoxyphenylacetic acid. The moles of acid precipitated from the solution as the sodium acid salt is calculated from the weight of the dry precipitate. The moles of tetramethylammonium alpha-methoxyphenylacetate equals the total moles of acid used (0.905) minus the moles of free acid present (about 0.400 mole) minus the total moles of acid initially precipitated as the acid salt (about 0.150 mole) and should be in the range of 0.350 to 0.400 mole. This quantity is multiplied by the factor 51/34 to obtain the amount of free acid which should be present, and the required additional free solid acid is added. The mixture is stirred for 0.5 hour, allowed to settle, and a 5 ml. sample pipetted from the clear top layer and titrated. Knowing the total volume of the solution, the amount of 75% solvent–25% water to add to make the solution 0.51 N in free acid can be calculated.

The reagent is allowed to stand at 0° C. for three or four days to allow all the sodium acid salt to precipitate, or stirred at 0° C. for four hours or longer, and filtered with suction while at 0° C. A 5 ml. sample is titrated to see that it is in the range 0.49 to 0.51 N, and 3:1 solvent-water is added if too strong. The reagent so prepared is stable; it may be stored over a long period of time and shipped as desired. This is true also for similar reagents prepared using 3,4-dichloro-alpha-methoxyphenylacetic acid.

EXAMPLE III

This example illustrates the quantitative determination of sodium using either of the reagents described in the previous examples. The method described here depends upon the precipitation of the sodium acid salt,

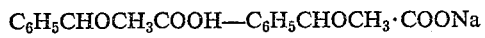
$C_6H_5CHOCH_3COOH—C_6H_5CHOCH_3 \cdot COONa$ dissolving the precipitate and the titration of this with standard base.

A weight of sample containing approximately 5 m.e. of sodium ion is placed in a 50 ml. Erlenmeyer flask together wtih 8 ml. of distilled water. After the sample has completely dissolved, 25 ml. of a standard reagent of this invention prepared with tetramethylammonium hydroxide or any of the other materials described herein is added and the contents of the flask are swirled until thoroughly mixed. The flask is capped with a 10 ml. beaker and allowed to stand at room temperature for half an hour. It is then held at about 0° C. overnight.

The next day, the material is quantitatively filtered and washed with three 5 ml. portions of acetone in a small pyrex fritted funnel. The precipitate is quantitatively dissolved in 100 ml. of hot water and this solution titrated with standard sodium hydroxide to a phenolphthalein endpoint. One equivalent of the sodium hydroxide is needed for each gram atom of sodium in the sample. A small amount of sodium in the sample is either not precipitated by the reagent or passes through the filter during the washing with acetone. This can be determined by evaporating the filtrate to dryness and carbonizing, adding sulfuric acid and ashing, and determining the residual sodium by dissolving the sodium sulfate ash in water, concentrating to a small volume, such as one quarter ml., and adding three volumes of a standard reagent of this invention. The precipitated acid salt is separated, washed with acetone and titrated as before except that it is done on a micro scale and the precipitate is conveniently separated by means of centrifuging instead of filtering.

Table III

ILLUSTRATIVE SODIUM ANALYSES

| Composition of known mixture in milligrams | Theory for Na | Found for Main titr | Na in Filtrate | Total |
|---|---|---|---|---|
| 1. 289 NaCl plus 781 KCl | 113.6 | 112.9 | 1.4 | 114.3 |
| 2. 279 NaCl plus 846 MgSO₄ | 109.7 | 105.1 | 1.4 | 106.5 |
| 3. 288 NaCl plus 639 NH₄Cl (chlorophenol red indicator) | 113.2 | 110.4 | 1.4 | 111.8 |
| 4. 297 NaCl (phenolphthalein indicator) | 116.9 | 116.3 | 1.2 | 117.5 |
| 5. 297 NaCl (chlorophenol red indicator) | 117.0 | 115.7 | 1.7 | 117.4 |
| 6. 282 NaCl plus 370 Li₂CO₃ | 111.0 | 113.1 | 1.4 | 114.5 |
| 7. 141 NaCl plus 104 BaCl₂ plus 138 SrCl₂ plus 180 CaCl₂ plus 270 MgCl₂ | 55.36 | 43.08 | 1.4 | 44.5 |

Results similar to those above are obtained when 3,4-dichloro-alpha-methoxyphenylacetic acid, a solid melting at 89° C., replaces the parent acid.

Instead of the volumetric procedure following the precipitation of the sodium acid salt the precipitate can be collected, dried and weighed. Standard gravimetric techniques can be used in this method. The insolubilities of the alpha-methoxyphenylacetic acids are such that very little precipitate is lost and the accuracy attained is most satisfactory.

The compounds that are used in this invention in the testing, either quantitative or qualitative, for sodium are derivatives of alpha-methoxyphenylacetic acid or similar acids such as 3,4-dichloro-alpha-methoxyphenylacetic acid, which acids can be prepared from the corresponding aldehydes, as, for example, by treating 3,4-dichlorobenzaldehyde with chloroform and sodium methoxide and hydrolyzing the resultant ester. The derivatives are salts of the acids with ammonia, amines or quaternary ammonium hydroxides or metals other than soduim. As can be seen above, the free acids are also used in sodium testing.

In the preparation of the reagent used in sodium testing, as, for example, in quantitative analysis, various solvents can be used besides the aqueous alcohol shown in the examples. Thus, the organic solvent can be dioxane, acetone, n-propyl alcohol, t-butyl alcohol, isopropyl alcohol or anhydrous ethyl alcohol, denatured ethyl alcohol, methanol, higher alcohols, methyl ethyl ketone and combinations thereof, among others. An organic solvent is not essential, however. For example, a saturated solution of alpha-methoxyphenylacetic acid in water about half-neutralized with a base, such as potassium hydroxide, can be used to detect sodium ion. Thus, this reagent when used on a test solution containing 5 mg. of sodium ion per ml. gave a big precipitate at 0° C. in about 3 minutes. While the organic solvent can be dispensed with, it is desirable because it enables one to have a higher concentration of the acid in the reagent and because the sodium acid salt is less soluble in organic solvents than in water.

Further, the medium for the reagent may be anhydrous. For example, an anhydrous mixture of acetone, the acid and lithium carbonate may be used as well as similar mixtures using an amine such as dimethylamine as the base instead of the carbonate. Similarly, the medium which is to be tested may be anhydrous, the material to be examined being dissolved in liquid sulfur dioxide, ammonia or in glacial acetic acid. To illustrate, a reagent is prepared by dissolving 3 grams of alpha-methoxyphenylacetic acid and 1 gram of potassium acetate in 10 ml. of glacial acetic acid. A test solution is prepared containing about 50 mg. of sodium ion in glacial acetic acid. When 3 volumes of the reagent is added to 1 volume of the test solution, a large amount of the sodium acid salt precipitates at room temperature in a few minutes. While water is not essential and while it may be desirable in some instances not to have it present, in the main, aqueous reagents and test media are prepared. They are conveniently prepared and highly effective.

A number of bases may be used; these include lithium carbonate, potassium carbonate, potassium hydroxide, lithium hydroxide, ammonia, amines, such as dimethylamine and trimethylamine and quaternary ammonium hydroxides such as tetramethylammonium hydroxide. Actually, any material may be used to neutralize part of the alpha-methoxyphenylacetic acid used that does not introduce interfering ions. Basic salts may be used, as for example, potassium acetate, potassium cyanide, potassium borate, potassium sulfide and the like or similar lithium salts. Also alkaline earth carbonates and hydroxides, such as calcium and barium hydroxides and carbonates or those of zinc and cadmium may be employed. Generally, tetramethylammonium hydroxide and potassium hydroxide are used. To illustrate specifically, a mixture of trimethylamine and acetone is readily developed into a reagent which is as good as the tetramethylammonium hydroxide reagent described in detail above. The L(+) and D(−) forms can be used in the formation of the sodium acid salt as well as the racemic form. Further, certain alpha-methoxyphenylacetic acids having halogen atoms in the phenyl group, such as 3,4-dichloro-alpha-methoxyphenylacetic acid, may be used instead of the parent acid. The 3-4-dichloro-alpha-methoxyphenylacetic acid has an advantage in that its sodium acid salt is more insoluble than that of the parent acid. It is, of course, recognized that the optimum ratio of acid to base in the reagent, the amounts of water and solvent, the concentration of free-acid or of combined alpha-methoxyphenylacetic acid and the volume of reagent to be used in testing will depend in part not only on the particular alpha-methoxyphenylacetic acid being used but on the base or the salt of the acid contained in the reagent. Further, it is possible to add the acid or a solution of the acid, for example, in an organic solvent, to the disolved form of the material being tested and then add to the resultant mixture an appropriate base to get optimum precipitation of the sodium acid salt if sodium is present. One skilled in the art, of course, will choose materials which are soluble or miscible with each other so that the only precipitation that can occur will be from any sodium ions present and the supplied arylacetate ions. In each instance, it will be obvious to one skilled in the art to prepare and use a reagent which will lead to a final mixture in the testing that is a buffered system in which the sodium acid salt, if sodium is present, has its minimum solubility. The pH may vary somewhat, for as discussed above the test procedures can be varied; for example, the temperatures involved are not limited to 0° C. or 20° C. and the optimum pH for maximum precipitation of the sodium acid salt will depend to some extent on the temperature. In most instances, the pH of the buffered mixture is best at about 3.1. In attaining the optimum pH, the base employed in partially neutralizing the methoxyphenylacetic acid being used is generally employed in an amount sufficient to neutralize about ⅗ of the acid present. Greater or less neutralization may be effected depending on the materials used; for aqueous systems the ⅗ extent is operable and in the main no difficulties are encountered in employing this factor with a wide variety of materials. If there is acid present in the test solution, the arylacetic acid may be neutralized even to the extent of complete neutralization but, of course, as stated, the pH of final mixtures comprising the reagent and test solution should be such as to insure maximum sodium acid salt precipitation. Thus, high pH values of 7.8 and above will be avoided, for at those values only the true or complete salt results. Thus, the pH values used will be below 7.8 and in the vicinity of 3.1.

The reagents of this invention and the processes for testing for sodium are superior to the currently used zinc uranyl acetate and the potassium antimonate reagents and the methods involving them. For example, this invention provides materials and processes for the ready testing of sodium. Further, such ions as potassium, lithium, ammonium, magnesium and all of the common anions including phosphate do not interfere with the tests. The precipitated sodium acid salt is a solid of constant composition; which is very stable, not hygroscopic and is easily determined by titration with base. The reagents of this invention are stable.

It is possible to prepare the various solid ingredients used in this invention and ship them separately or in mixtures. Since certain of the salts are hygroscopic, the ready-to-use liquid reagent is usually prepared in the first instance.

While the invention has been disclosed herein in connection with certain embodiments and certain procedural details, it is clear that changes, modifications or equivalents can be used by those skilled in the art; accordingly, such changes within the principles of this invention are intended to be included within the scope of the claims below.

I claim:
1. As a composition of matter, a buffered aqueous system comprising a solution of alpha-methoxyphenylacetic acid and a soluble salt of alpha-methoxyphenylacetic acid which salt is not a sodium salt of said acid, said solution having a pH of between about 3.1 and about 7.8 and said solution being substantially sodium-free.

2. A composition in accordance with claim 1 which contains an organic solvent.

3. A composition in accordance with claim 1 in which about ⅗ of the said acid is partially neutralized.

4. A composition in accordance with claim 1 in which said soluble salt is a metal salt.

5. A composition in accordance with claim 4 in which said metal is potassium.

6. A composition in accordance with claim 1 in which said soluble salt is an ammonium salt.

7. A composition in accordance with claim 6 in which said ammonium salt is a quaternary ammonium salt.

8. A composition in accordance with claim 1 in which said salt is an amine salt.

9. A composition of matter comprising a substantially sodium-free mixture of alpha-methoxyphenylacetic acid and a soluble salt of alpha-methoxyphenylacetic acid which salt is not a sodium salt of said acid.

10. A composition in accordance with claim 9 which contains water and an organic solvent.

11. A composition of matter comprising a mixture of alpha-methoxyphenylacetic acid and a soluble tetramethylammonium salt of alpha-methoxyphenylacetic acid.

12. A composition in accordance with claim 11 which contains water and ethanol.

13. A process for testing a material for sodium which comprises forming a solution of said material; forming a substantially sodium-free solution of alpha-methoxyphenylacetic acid and a soluble salt of alpha-methoxyphenylacetic acid; mixing the said solutions together to form a buffered system in which the sodium acid salt of alpha-methoxyphenylacetic acid has minimal solubility, thereby precipitating any sodium present in said solution of said material as the sodium acid salt of the said alpha-methoxyphenylacetic acid.

14. A process in accordance with claim 13 in which said sodium-free solution contains an organic solvent.

15. A process in accordance with claim 13 in which the said resultant buffered system from which the said acid salt is precipitated has a pH of between about 3.1 and about 7.8.

References Cited in the file of this patent

UNITED STATES PATENTS

| | | |
|---|---|---|
| 2,659,753 | Plump | Nov. 17, 1953 |
| 2,685,600 | Morris et al. | Aug. 3, 1954 |
| 2,731,330 | Codell et al. | Jan. 17, 1956 |
| 2,767,063 | Chesney | Oct. 16, 1956 |
| 2,770,651 | Hlynsky | Nov. 13, 1956 |

OTHER REFERENCES

Bonner: J. Am. Chem. Soc., vol. 73, July 1951, pp. 3126 to 3132.

Tshoubar et al.: Bul. Soc. Chim. France. (1948), pp. 959–62.

Reeve et al.: J.A.C.S., vol. 72, pp. 1482–3 (1950).

Vystrcil et al.: Chem. Abs., vol. 46, page 1515 (1952).